United States Patent
Krishnakumar

(10) Patent No.: US 10,671,161 B2
(45) Date of Patent: Jun. 2, 2020

(54) MULTI DISPLAY EYE TRACKING

(71) Applicant: Dell Products L.P., Round Rock, TX (US)

(72) Inventor: Karthik Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/057,931

(22) Filed: Aug. 8, 2018

(65) Prior Publication Data

US 2020/0050265 A1    Feb. 13, 2020

(51) Int. Cl.
| | |
|---|---|
| G06F 3/01 | (2006.01) |
| G06F 3/041 | (2006.01) |
| G06T 7/70 | (2017.01) |
| G06F 3/14 | (2006.01) |

(52) U.S. Cl.
CPC .............. *G06F 3/013* (2013.01); *G06F 3/041* (2013.01); *G06F 3/1431* (2013.01); *G06T 7/70* (2017.01)

(58) Field of Classification Search
None
See application file for complete search history.

(56) References Cited

U.S. PATENT DOCUMENTS

| | | | | |
|---|---|---|---|---|
| 7,391,887 B2* | 6/2008 | Durnell | .............. | G06K 9/00604 340/5.8 |
| 9,652,033 B2* | 5/2017 | Smith | .................... | G06F 3/1454 |
| 2012/0326945 A1* | 12/2012 | Ellis | ...................... | G06F 3/1423 345/1.1 |
| 2019/0064513 A1* | 2/2019 | Bagherpour | .......... | G06F 3/0484 |

* cited by examiner

*Primary Examiner* — Kenneth B Lee, Jr.
(74) *Attorney, Agent, or Firm* — Zagorin Cave LLP; Robert W. Holland

(57) ABSTRACT

Eye tracking across multiple displays is supported with re-definition of a gaze vector matrix that correlates a surface of a first display with detected eye gazes as inputs to an information handling system to include a surface of a second display. Eye gazes that correlate to the second display are mapped to the redefined gaze vector matrix, such as with a calibration performed by a user or an estimate derived from tracked eye gazes. The information handling system applies a map of display surface areas to the gaze vector matrix to sort reported eye gazes as at a location of the first display surface, a location of the second display surface or discarded as outside of either display surface.

19 Claims, 4 Drawing Sheets

MULTI DISPLAY EYE TRACKING

BACKGROUND OF THE INVENTION

Field of the Invention

The present invention relates in general to the field of information handling system display presentation, and more particularly to information handling system multi-display eye tracking.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally interact with end users through input/output devices. Typical input devices include a keyboard, a mouse, a touchpad and a touchscreen display. Typical output devices include a liquid crystal display (LCD) and an organic light emitting diode (OLED) display. Generally, inputs are coordinated through an embedded controller, also known as a keyboard controller, and passed to an operating system executing on a central processing unit (CPU) for use by the operating system or an application if appropriate. Outputs to a display are generally defined by the CPU and passed to a graphics processing unit (GPU), which generates pixel values that define colors for each pixel of the display. Generally, the pixel values create a visual image with a timing controller of the display that scans values provided from the GPU across the pixels of the display. In the event that the display presents a touch area associated with an input value, touches detected at the display are coordinated as inputs through the operating system and a touch controller by tracking input value areas presented by the GPU. For example, the input user interface is located at a display based upon the pixels of the display that present the user interface and associated with a touch detection grid that determines touch input locations at the display. Generally, hardware, software and firmware processing components all cooperate to coordinate input values.

A more recently introduced type of input device is an eye tracking device that determines an end user's gaze position on a display to assign an input value, such as based upon an end user's gaze at a portion of the user interface that is assigned a value. Eye tracking is generally performed by a cameral integrated in a display or coupled to a display as an external unit. The eye tracking camera captures and end user's face and applies image discrimination techniques to isolate the pupils of the end user so that the gaze direction of the end user is determined and assigned with a one-to-one mapping to the display area. The eye tracking module applies the relative position of the display and the detected position of the end user to isolate the end user's gaze position on the display, such as the pixels on which the end user is focused. To achieve accurate tracking, the display is typically calibrated for its position relative to the eye tracking module and then an eye tracking algorithm converts positions of the eye into X,Y coordinates, which are then communicated to the operating system as a location input similar to a touchscreen touch input.

Many information handling systems will work with multiple displays that present visual information, such as by coupling each display with a separate cable to a common graphics card. Operating systems typically include standardized options that control how visual images are presented across multiple displays. For example, a second display may mirror the output of a first display; or a second display may provide an extended display from the first display. End users often use the extended display option to perform separate tasks on separate displays. For instance, an end user might perform word processing on one display rotated to a portrait orientation while performing graphics creation at a second display rotated to a landscape orientation. One recent innovation provides a horizontal display on a desktop to accept touch inputs, such as drawing with a stylus pen while presenting controls are a vertical display. Because multiple displays may have multiple orientations and locations relative to each other, eye tracking typically is used at one display at a time with each display having its own eye tracking module.

SUMMARY OF THE INVENTION

Therefore, a need has arisen for a system and method which provides multiple display eye tracking with a common eye tracking module.

In accordance with the present invention, a system and method are provided which substantially reduce the disadvantages and problems associated with previous methods and systems for tracking inputs made to a display location by eye gaze. A gaze vector matrix defines gaze vectors across plural displays for a shared eye tracking device. The eye tracking device reports gaze locations based upon the gaze vector matrix, and the information handling system maps the gaze vector matrix coordinates to a display surface location of a display to determine an input value.

More specifically, an information handling system presents visual information at plural displays with one or more graphics processing unit, including user interfaces associated with input values. An eye tracking device coupled to a first display tracks gazes as inputs at the first display device with a gaze vector matrix. For instance, the gaze vector matrix defines a one-to-one relationship of gazes at the first display when tracking inputs only to the single display. In a multi monitor tracking configuration, the gaze vector matrix extends outside of the perimeter of the first display to encompass one or more other adjacent displays interfaced with the information handling system. The eye tracking device reports gaze vector locations with coordinates as if monitoring the single display, however the coordinates include all displays monitored by the eye tracking device, such as by including the displays' size, resolution and orientation. A map of the gaze vector matrix to the display surface is generated with a calibration process so that gaze vector coordinates are translated to display surface coordinates associated with the input value.

The present invention provides a number of important technical advantages. One example of an important technical advantage is that an eye tracking device that tracks inputs at a display is extended to track inputs at plural displays through a shared gaze vector matrix defined to encompass the perimeter of the plural displays. Manual, automatic or estimated calibration of display surface area mapped to the shared gaze vector matrix allows the information handling system to associate inputs through a gaze detection with user interface values presented at a display. Gaze detection thus extends from a one-to-one relationship defined by an eye detection device integrated with a display to include gaze detection at other display devices interfaced with the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system adapts eye tracking associated with a single display to track across multiple displays through a shared gaze vector matrix. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
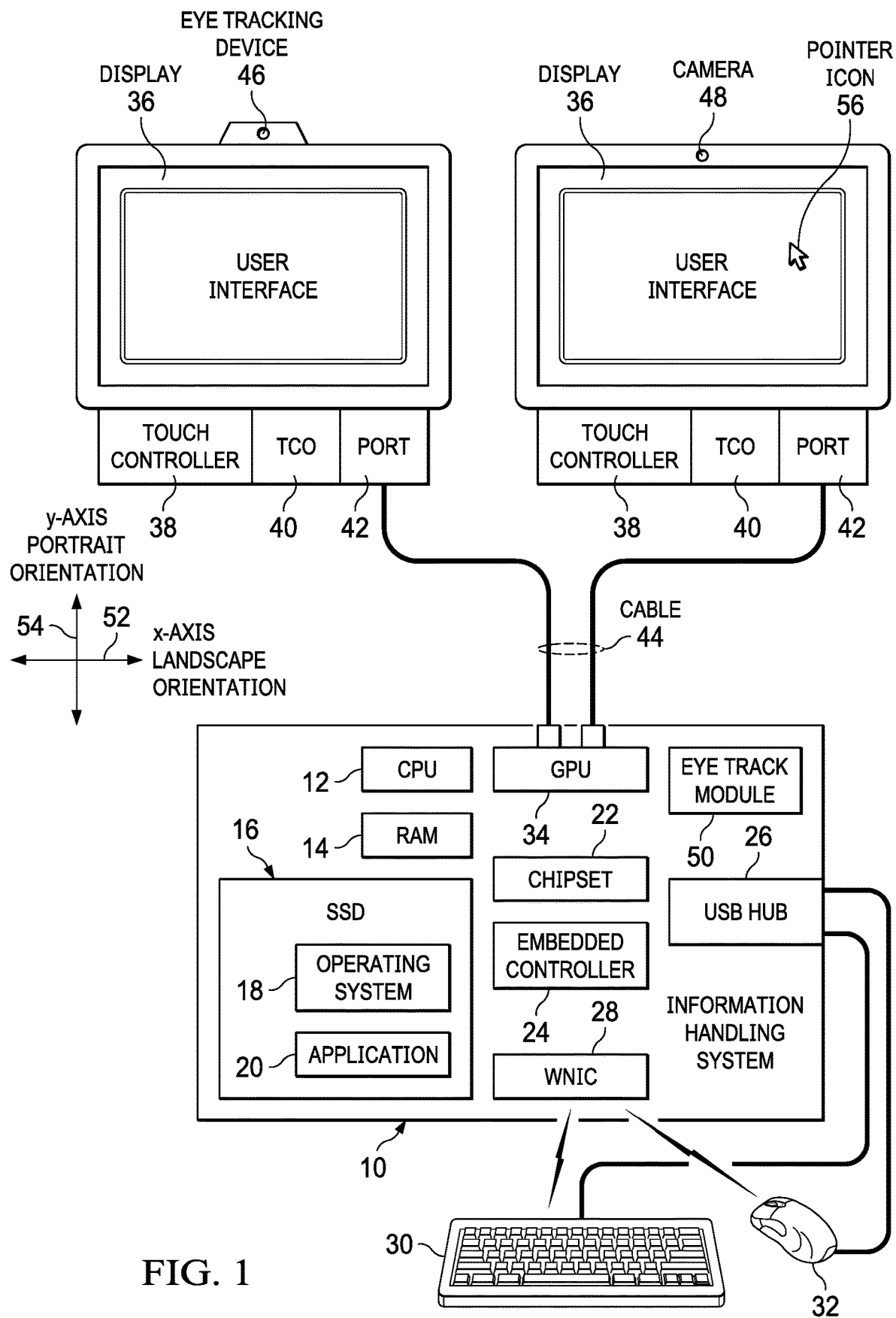
FIG. 1 depicts a block diagram of an information handling system having eye tracking extended from a single display to multiple displays.

Referring now to FIG. 1, a block diagram depicts an information handling system 10 having eye tracking extended from a single display 36 to multiple displays 36. In the example embodiment, a portable, desktop or other type of information handling system 10 has a central processing unit (CPU) 12 that executes instructions stored in random access memory (RAM) 14, such as instructions of an operating system 18 and/or applications 20 retrieved from persistent storage of a solid state drive (SSD) 16. A chipset 22 includes processing components that execute embedded code stored in flash or other persistent memory to coordinate communication with CPU 12, such as with a memory controller and various communication links. An embedded controller 24 executes embed code that manages power and input devices, such as coordinating boot of the operating system at application of power and providing keyboard 30 and mouse 32 inputs to CPU 12. In the example embodiment, a USB hub 26 managed by embedded controller 24 provides cabled USB interfaces with peripheral devices. Alternatively, a wireless network interface card (WNIC) 28 supports wireless interfaces with peripheral devices, such as keyboard 30 and mouse 32.

In the example embodiment, a graphics processor unit (GPU) 34 interfaces with CPU 12 to receive visual information for presentation as visual images at displays 36. For instance, GPU 34 processes visual information into pixel values that define a visual image at pixels of each display 36, such as by defining a color of each pixel. A cable 44, such as a DisplayPort cable, communicates the pixel values to a port 42 of each display 36 so that timing controller 40 scans the pixel values to pixels disposed in an array of display 36, such as an array that meets standardized display resolutions defined by HDMI or 4K specifications. For example, HDMI resolution in high definition has 1920×1200 pixels disposed in a matrix that TCO 40 scans values to in order to present a visual image. In the example embodiment, displays 36 also include a touchscreen surface, such as a capacitive touch surface, that a touch controller 38 interfaces with to detect touch locations. For instance, a touch surface may have a touch resolution that matches the display pixel resolution so that touches may be attributed to precise locations of display 36, such as a location of a user interface presented on the display that accepts touch inputs.

In the example embodiment, an end user may also input information by an eye gaze at a location of either of the two displays 36, such as at a user interface presented as a visual image at a display 36 and associated with an input value. An eye tracking device 46 is coupled to one of the displays 36 in a fixed location and directed towards an end user viewing the display 36. Eye tracking device 46 analyzes an image of an end user's eyes to determine a gaze of the end user relative to display 36. For example, a typical eye tracking device provides infrared illumination towards the end user to highlight the end user's pupils and then analyzes the pupils to determine a gaze axis. By knowing a relative position of eye tracking device 46 to display 36, the gaze axis resolves to a gaze location on display 36. In some instances, eye tracking device 46 integrates in display 36 at a fixed location so that the relative position of eye tracking device 46 to visual images is a defined and known value. In typical integrated eye tracking devices 46, a gaze vector matrix defines coordinates in an X-axis 52 and a Y-axis 54 that the eye tracking device 46 reports to information handling system 10 as inputs. For instance, a gaze vector matrix for display 36 matches the dimensions and resolution of display 36 so that gaze coordinates match touch coordinates and pixel locations of display 36. In a display 36 having an integrated eye tracking device 46, the gaze vector matrix need not extend beyond the X and Y dimensions of display 36. In some instances, eye tracking device 46 is a peripheral device that couples to different sizes of displays 36. In such embodiments, a calibration is typically performed that determines the relative location of eye tracking device 46 to the display 36.

Advantageously, an eye tracking module 50 interfaced with eye tracking device 46 extends eye tracking from its application in a single display 36 to a multiple display configuration of two or more displays 36 interfaced with GPU 34. Eye tracking module 50 is, for example, various combinations of hardware, software and firmware that interact with eye tracking device 46 to extend the gaze vector matrix across multiple displays. In the example embodiment, eye tracking module 50 is a driver stored in non-transient memory, such as flash memory or SSD 16, that executes on one or both of CPU 12 and GPU 34, such as with a component included in operating system 18. Eye tracking module 50 adjusts the gaze vector matrix used by eye tracking device 46 to extend from a single display 36 across two or more displays 36, such as the first and second displays 36 depicted in the example embodiment of FIG. 1. Once the gaze vector matrix extends across both displays 36, eye tracking device 46 reports coordinates as if it is detecting gaze positions for a single display having a dimension that extends across both displays 36. Eye tracking module 50 receives the gaze coordinates and compares the gaze coordinates with the dimensions of each display 36 to report a gaze to CPU 12 or operating system 18 at the display location of the display 36 that is associated with the gaze coordinate.

As an example, eye tracking module 50 interfaces with eye tracking device 46 to retrieve the single-display gaze vector matrix, such as a gaze vector matrix having a one-to-one coordinate relationship with pixels of the single display surface monitored by it. Eye tracking module 50 then adjusts the gaze vector matrix so that it includes all of the original display surface plus the display surface of an adjacent display 36 that is interfaced with GPU 34. For example, eye tracking module 50 defines X and Y coordinates that include the surface of both displays 36 and the space between them, and saves the coordinates to eye tracking device 46 as an updated gaze vector matrix. Eye tracking module 50 then associates coordinates reported by eye tracking device to a surface area of the first display 36, a surface of the second display 36, and empty space between the displays 36. Eye tracking module 50 then maps reported coordinates of the gaze vector matrix to the surface areas to report inputs from eye tracking device to operating system 18 as input positions on the first display or the second display, or to discard coordinates that fall outside of the display areas. Eye tracking module determines a location of the second display 36 relative to eye tracking device 46 through a manual, automatic or estimated calibration process. Manual calibration is performed by presenting visual images at known locations of the second display 36 and associating a detected gaze by eye tracking device 46 at the second display known location. Automatic calibration is performed by monitoring gaze of the end user and associating known positions with detected gazes, such as when an end user makes an input with a pointer icon 56 or touch, by assuming an end user looks at an input location when making an input. In one embodiment, estimated calibration is performed with a camera 48 that captures an image of the end user so that the angle of the end user's face relative to the second display is associated with gaze coordinates detected by eye tracking device 46.

Figure 2:
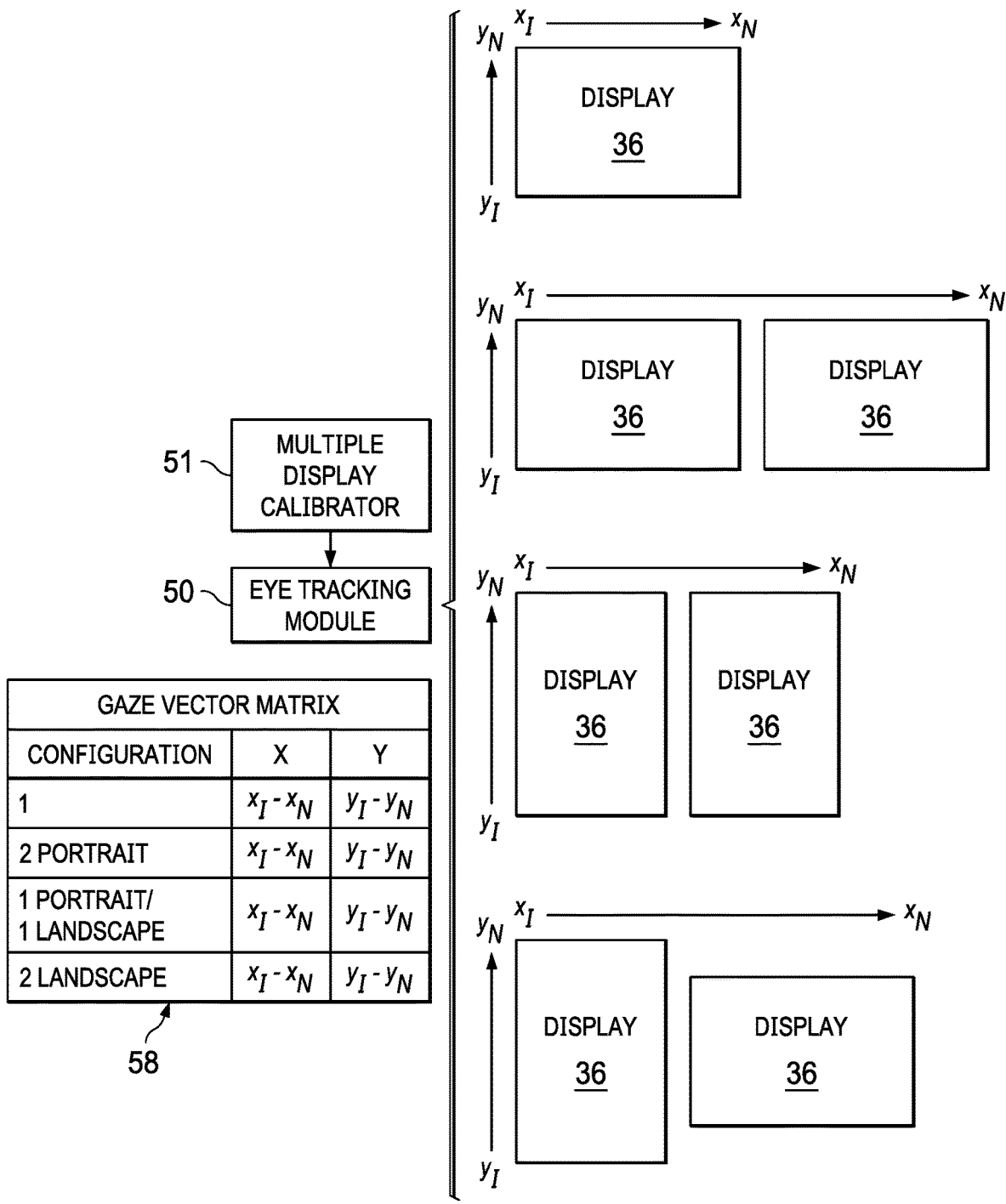
FIG. 2 depicts a block diagram of a system for calibrating eye tracking across multiple displays.

Referring now to FIG. 2, a block diagram depicts a system for calibrating eye tracking across multiple displays. In the example embodiment, configuration 1 of gaze vector matrix 58 has X and Y coordinates with a one-to-one relationship to pixels of a single display 36, such as may be found as a default for an eye tracking device integrated in display 36. If an information handling system has multiple displays that present visual information has visual images, a multiple display calibrator 51 coordinates mapping of the additional display surfaces so the gaze vector matrix 58 includes both displays 36. As an example, first and second displays that have equal dimensions aligned in landscape orientation have a 2 landscape configuration that has the same size Y axis coordinates but twice the X coordinates plus extra space located between the displays. Similarly, first and second displays with equal dimensions aligned in portrait orientation have the same Y coordinates aligned in portrait orientation and X coordinates for the two displays plus extra space located between the displays. In an example embodiment where two displays have different sizes or orientations, the X and Y coordinates extend outward to encompass the perimeter of both displays. In addition, gaze vector matrix 58 may be calibrated to account for different display resolutions, such as by having a one-to-one association with the display having greater resolution and assigning multiple gaze coordinates to each pixel location of the display with the least resolution.

Multiple display calibrator 51 maps gaze vector matrix 58 configurations to display surface locations based upon indicia of the relative location of the second display to the display tracking device. For example, during a calibration process, an end user is asked to gaze at calibration locations of the second display that are presented as visual images. Multiple display calibrator 51 then applies the gaze location to determine the position of the display surface location at which the calibration mark was presented. This allows a determination of the total viewing area of the combined displays, which is saved as the gaze vector matrix for that configuration, and a mapping of the detected viewing location to the display surface so that the operating system can reference the gaze vector matrix and relative location of the displays to report a gaze input value as a coordinate of the display.

Figure 3:
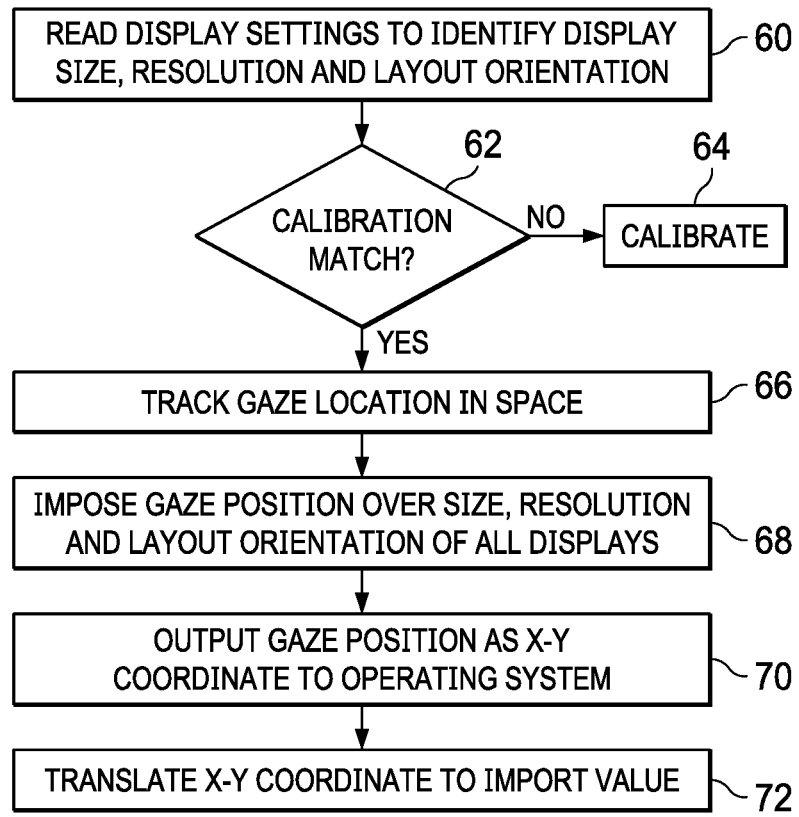
FIG. 3 depicts a flow diagram of a process for eye tracking across multiple displays.
Figure 4:
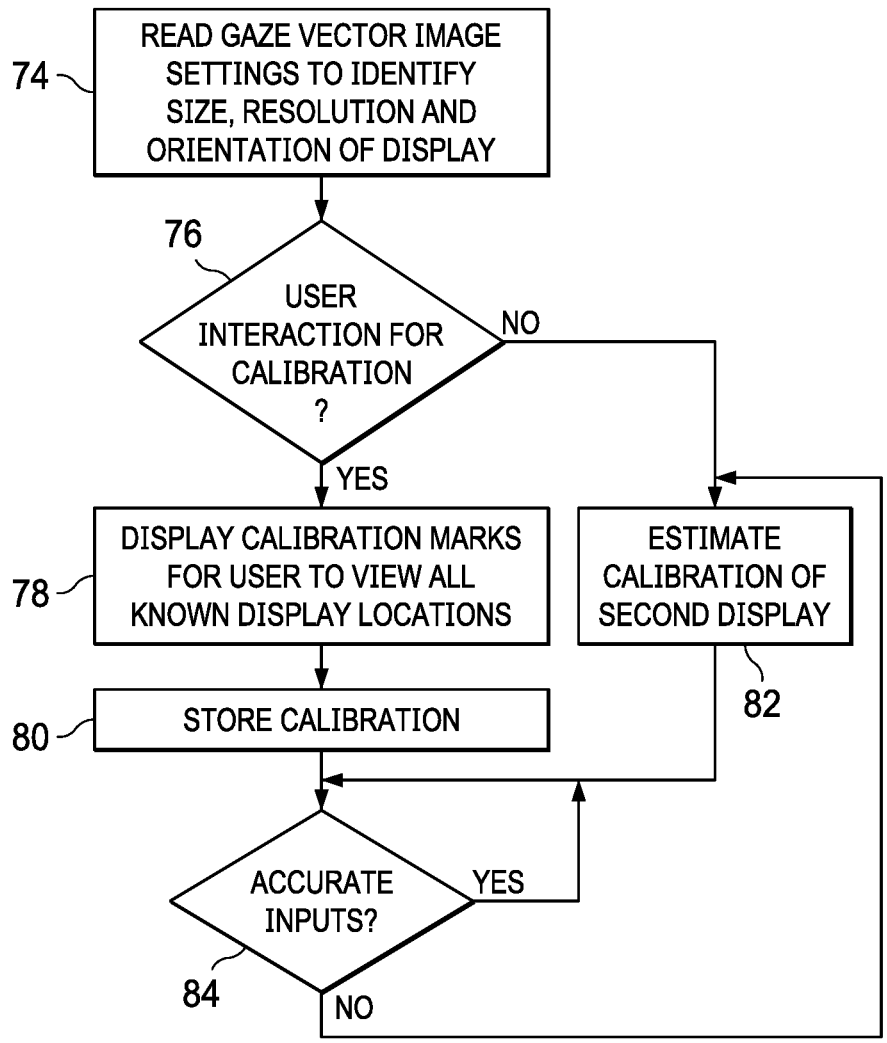
FIG. 4 depicts a flow diagram of a process for calibrating eye tracking across multiple displays.

Referring now to FIG. 3, a flow diagram depicts a process for eye tracking across multiple displays. The process starts at step 60 by reading the display settings to identify the display size dimensions, the resolution and the layout orientation. If the detected information matches an existing gaze vector matrix at step 62, the process continues to step 66, otherwise the process proceeds to step 64 to perform a multiple display calibration, such as is depicted by FIG. 4. Once a gaze vector matrix configuration is selected, at step 66 the process tracks gaze location in space. At step 68, detected gaze location is imposed over the size, resolution and layout orientation of displays calibrated to the eye tracking device. At step 70, coordinates are output to the operating system or other resource that states the gaze position as X-Y coordinates of the gaze vector matrix location. At step 72, the X-Y coordinates are translated to an input value based upon the display input value at the X-Y coordinate location display surface.

Referring now to FIG. 4, a flow diagram depicts a process for calibrating eye tracking across multiple displays. The process starts at step 74 by reading the gaze vector matrix settings to identify the size, resolution and orientation of displays interfaced with the information handling system. At step 76 a determination is made of whether a user interaction is available for calibration. If yes, the process continues to step 78 to present calibration marks for the user to view at known locations of the second display. As a gaze is determined for each calibration mark, the surface position of the calibration mark is applied to define a gaze vector matrix that includes all of the displays supported by the information handling system. At step 80, the calibration is stored along with the display size, resolution and orientation so that the calibration may be re-used on subsequent starts of the information handling system. If user interaction is not available, the process continues to step 82 to estimate calibration at the second display, such as with a camera viewing the end user or with gaze coordinates estimated from end user inputs based upon an assumption that the end user is viewing the input area at the time of the input. At step 84 a comparison is made to determine if gaze inputs match expected end user inputs in order to validate the accuracy of the gaze inputs. For example, periodic comparisons to validate gaze vector accuracy ensures that changes to the location or orientation of the second display will not introduce inaccuracy in the display calibration as stored in the gaze vector matrix.

Figure 5:
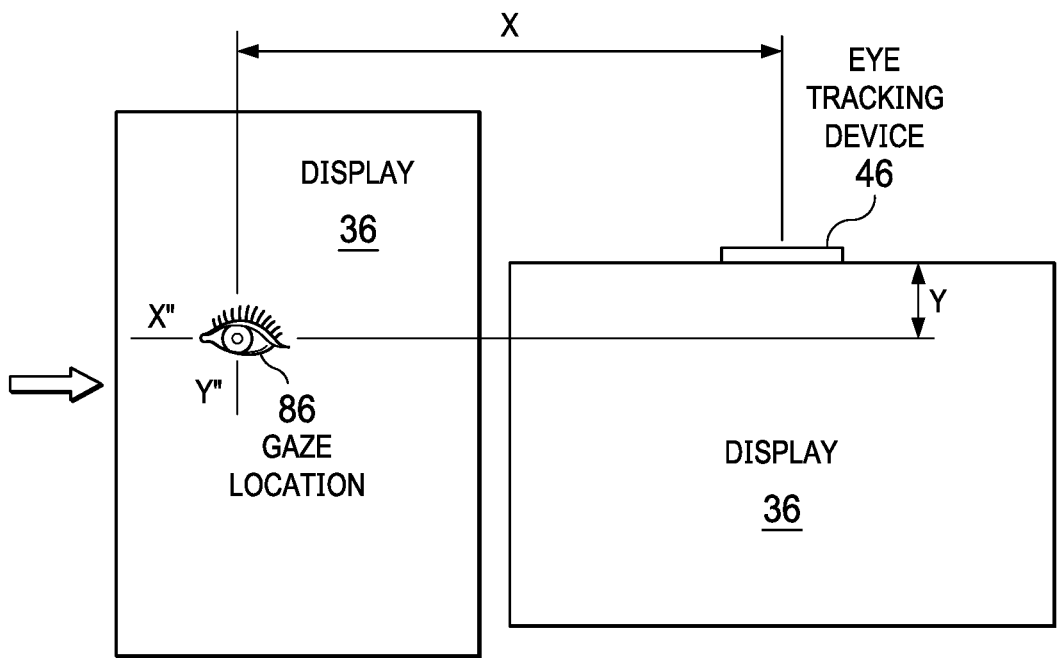
FIG. 5 depicts an example of eye gaze coordinates shared between multiple displays.

Referring now to FIG. 5, an example embodiment depicts eye gaze coordinates shared between multiple displays. In the example embodiment, eye tracking device 46 reports a gaze location 86 with coordinates X and Y based upon the location of the eye gaze vector in a matrix that encompasses the surface area of both displays 36. Once the X-Y coordinates are reported to the information handling system, calibrated positions of each display relative to eye tracking device 46 are resolved to find the coordinate X" and Y" that defines the location on the surface of the second display that corresponds to the X and Y coordinates of the gaze vector matrix. The X" and Y" coordinates are reported to the operating system similar to touch or mouse coordinates based upon the location of the input at the display.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to process information;
a memory interfaced with the processor and operable to store the information;
a graphics controller interfaced with the processor and memory and operable to present the information as visual images at first and second displays;
a first display interfaced with the graphics controller to present visual images;
a second display interfaced with the graphics controller to present visual images;
an eye tracking device coupled to the first display and configured to report eye gaze as a coordinate on the first display from a first set of coordinates defined over a surface of the first display;
an eye tracking module interfaced with the eye tracking device and the second display, the eye tracking module assigning a second set of coordinates to the eye tracking device, the second set of coordinates defined over at least the surface of the first display and extending over at least part of a surface of the second display, the eye tracking module converting gaze coordinates reported from the eye tracking device into position coordinates at one of the first or second displays;
a first configuration with the first set of coordinates mapped to only the first display surface; and
a second configuration with the second set of coordinates mapped to both the first display surface and the second display surface, the second set of coordinates including space between the first and second displays.

2. The information handling system of claim 1 wherein the second set of coordinates include space between the first display surface and the second display surface.

3. The information handling system of claim 1 wherein the gaze vector matrix further comprises a third configuration with the second set of coordinates mapped to both the first display surface aligned in a landscape orientation and the second display surface aligned in a portrait orientation, the second set of coordinates including space above the first display.

4. The information handling system of claim 1 further comprising a multiple display calibrator interfaced with the eye tracking module and operable to present visual markers at known positions on the second display to associate the eye tracker with the second set of coordinates.

5. The information handling system of claim 1 further comprising a multiple display calibrator interfaced with a camera integrated in the second display and operable to apply images captured by the camera to estimate the second set of coordinates.

6. The information handling system of claim 1 further comprising a multiple display calibrator interfaced with the eye tracking module and applying a size, resolution and orientation of each of the first and second displays to determine the second set of coordinates.

7. The information handling system of claim 6 wherein the multiple display calibrator is further operable to:
detect a change in orientation of the first or second display; and
in response to determine a second set of coordinates that includes the surface area of the first and second displays adjusted for the change in orientation.

8. A method for tracking eye gaze at first and second displays, the method comprising:
tracking eye gaze at the first display with a single eye tracking device coupled to the first display;
reporting gaze points from the first display that fall within a gaze vector matrix corresponding with the first display surface;
adjusting the gaze vector matrix to correspond with the first display surface and a second display surface of a second display, the second display surface spaced apart and separate from the first display surface;
reporting gaze points from the single eye tracking device that fall within the adjusted gaze vector; and
applying the gaze points as inputs to the first display that correspond to the first display surface and as inputs to the second display that correspond to the second display surface.

9. The method of claim 8 wherein:
adjusting the gaze vector matrix further comprises defining a perimeter that includes all of the surface of both the first display and the second display; and
applying the gaze points as inputs further comprises, discarding gaze points as inputs that fall outside of the first display surface and the second display surface.

10. The method of claim 8 further comprising:
presenting calibration marks at the second display; and
applying gaze points reported in response to the calibration marks to adjust the gaze vector matrix to include the second display surface.

11. The method of claim 10 further comprising:
detecting a change in orientation of the second display from a landscape orientation to a portrait orientation; and in response to the detecting, adjusting the gaze vector matrix to define a perimeter that includes all of the surface of the second display in the portrait orientation based upon the gaze points reported in response to the calibration marks in the landscape orientation.

12. The method of claim 8 further comprising:
detecting an image of an end user viewing the first display with a camera integrated in the second display;
detecting a gaze point of the end user at the first display; and
applying the image and the gaze point to estimate a calibration of the second display for the adjusted gaze vector matrix.

13. The method of claim 8 further comprising:
detecting a touch input at the second display;
detecting a gaze point of the end user at the touch input; and
applying the gaze point to estimate a calibration of the second display for the adjusted gaze vector matrix.

14. The method of claim 8 further comprising applying a size, resolution and orientation of each of the first and second displays to determine the adjusted gaze vector matrix.

15. The method of claim 8 wherein adjusting the gaze vector matrix to correspond with the first display surface and a second display surface further comprises:
tracking gaze points outside of the first display surface; and
applying the gaze points outside of the first display surface to estimate the second display surface.

16. A system for tracking eye gaze at plural displays, the system comprising:
an eye tracking device coupled to a first display and configured to report eye gazes at the surface of the first display to an information handling system; and
non-transitory memory integrated in the information handling system storing instructions that when executed on a processing component:
configure the eye tracking device to report eye gazes outside of the surface of the first display including at least a portion of a display surface of a second display disposed spaced and separate from the first display;
map eye gazes reported by the eye tracking device that correspond to the first display as eye gaze inputs to the first display; and
map eye gazes reported by the eye tracking device that correspond to a second display surface area as eye gaze inputs to the second display.

17. The system of claim 16 wherein the instructions further discard eye gazes reported by the eye tracking device that fail to correspond to the first display surface area or the second display surface area.

18. The system of claim 16 wherein the instructions further:
track reported eye gazes outside of the first display surface; and
calibrate the map of eye gazes to the second display surface by analyzing eye gazes outside of the first display surface and input device inputs to the information handling system.

19. The system of claim 16 wherein the instructions further:
present calibration marks at the second display surface; and
calibrate the map of eye gazes to the second display based upon end user gazes at the calibration marks.

\* \* \* \* \*